US 6,684,088 B1

United States Patent
Halahmi

(10) Patent No.: US 6,684,088 B1
(45) Date of Patent: Jan. 27, 2004

(54) SYSTEM AND METHOD FOR DISPLAYING ELECTRONIC MAIL MESSAGES ON A LOW BANDWIDTH DEVICE

(75) Inventor: Erez Halahmi, Petach Tikva (IL)

(73) Assignee: Axi Mobile Ltd., Ra'Anana (IL)

( * ) Notice: Subject to any disclaimer, the term of this patent is extended or adjusted under 35 U.S.C. 154(b) by 0 days.

(21) Appl. No.: 09/516,118

(22) Filed: Mar. 1, 2000

(51) Int. Cl.$^7$ ................................................. H04B 1/38
(52) U.S. Cl. ..................... 455/566; 455/412.1; 455/466
(58) Field of Search ........................... 455/412.1, 412.2, 455/466, 566; 340/7.51, 7.52, 7.55

(56) References Cited

U.S. PATENT DOCUMENTS

| | | | | |
|---|---|---|---|---|
| 5,448,759 A | * | 9/1995 | Krebs et al. ................. | 455/517 |
| 5,895,476 A | | 4/1999 | Orr et al. ..................... | 707/517 |
| 5,907,837 A | | 5/1999 | Ferrel et al. ................... | 707/3 |
| 6,034,970 A | * | 3/2000 | Levac et al. ................. | 370/466 |
| 6,072,385 A | * | 6/2000 | Maenishi .................... | 340/7.55 |
| 6,154,766 A | * | 11/2000 | Yost et al. ................... | 707/100 |
| 6,370,388 B1 | * | 4/2002 | Vitel .......................... | 455/466 |
| 6,430,574 B1 | * | 8/2002 | Stead ...................... | 707/104.1 |

OTHER PUBLICATIONS

Fox et al, "Adapting to Network and Client Variability via On-Demand Dynamic Distillation", ACM Arch. Support for Programming Languages and Operating Systems. Oct. 96, pp 160–170.

* cited by examiner

Primary Examiner—Quochien Vuong
(74) Attorney, Agent, or Firm—G. E. Ehrlich (1995) Ltd.

(57) ABSTRACT

A method and a system for transmitting e-mail messages to, and displaying the contents of such messages by, a low bandwidth device, such as a wireless communication device for example. The system and method are particularly preferred for WAP-enabled devices of any type. The system and method are operative with any e-mail protocol.

23 Claims, 7 Drawing Sheets

Fig. 3A

Original message:

```
Date:    27 Aug 96 1932 PDT
From:    Joshua Bing <JBing@mymail.com >
Subject: Re: What's up
Reply-To: JBing@mymail.com
To:  Yosef Shani <Yosef.Shani@hismail.net>
cc:  Eran Ganot<egan@hotmai.com>

Hi.
I'm fine thanks. How R U ?

Keep writing !

Josh.
```

Fig. 3B

Example conversion:

```
<?xml version="1.0"?>
<!DOCTYPE <WML> PUBLIC "-//WAPFORUM//DTD <WML> 1.1//EN"
   "http://www.wapforum.org/DTD/wml_1.1.xml">

<wml>
   <card>
       <b>Date:</b>   27 Aug 96 1932 PDT <br/>
       <b>From:</b>   Joshua Bing <JBing@mymail.com><br/>
       <b>Subject:</b>  Re: What's up<br/>
       <b>Reply-To:</b>  JBing@mymail.com<br/>
       <b>To:</b>   Yosef Shani <Yosef.Shani@hismail.net><br/>
       <b>cc:</b>   Eran Ganot<egan@hotmai.com><br/>
       <br/>
       Hi.<br/>
       I'm fine thanks. How R U ?<br/>
       <br/>
       Keep writing !<br/>
       <br/>
          Josh.<br/>
   </card>
</wml>
```

SYSTEM AND METHOD FOR DISPLAYING ELECTRONIC MAIL MESSAGES ON A LOW BANDWIDTH DEVICE

FIELD AND BACKGROUND OF THE INVENTION

The present invention relates to a system and method for displaying e-mail (electronic mail) messages on a device, such as a low bandwidth and/or wireless communication device, and in particular, to such a system and method which enable such messages to be automatically divided into a plurality of smaller portions for transmission and/or display of each portion, as well as such a system and method which enable the e-mail message to be converted in a streamed manner. The system and method of the present invention are particularly useful for transmission and display of e-mail messages by a WAP (wireless application protocol) enabled device.

Cellular telephones are becoming increasingly popular for portable telephone use, particularly for users who are interested in rapid, mobile communication. As the amount of computational power and memory space which are available in such small, portable electronic devices becomes increased, a demand has arisen for different types of communication services through such devices. In particular, users have demanded that cellular telephones receive many different types of multimedia data, including e-mail (electronic mail) messages and Web pages.

In response to such demands, and to extend the power and efficacy of operation of portable, wireless electronic communication devices, the WAP (wireless application protocol) de facto standard has been developed. WAP is now the standard for the presentation and delivery of wireless data, including multimedia and other information, and telephony services, on mobile telephones and other types of wireless communication devices. WAP is designed to efficiently provide both multimedia and telephony services to such wireless communication devices, given the limitations of wireless networks and of the electronic devices themselves.

Wireless communication devices have requirements and drawbacks which are different than cable-linked electronic devices. For example, wireless networks are frequently significantly less stable than cable networks. Since users with such portable communication devices often operate these devices at different locations, the wireless network connection may not always be available, and may even suddenly become unavailable during a single communication session. In addition, the wireless communication devices themselves are more limited in terms of available resources than desktop computers. For example, such wireless communication devices typically have a less powerful CPU (central processing unit), less memory, a lower amount of available power since these devices are often battery-operated, and smaller display screens. Thus, wireless communication devices require adaptations of existing software and data transmission protocols in order to effectively deliver multimedia content from the Internet.

WAP provides the required adaptations and modifications to such software and data transmission protocols in order to meet the requirements of wireless communication devices. For example, HTML (Hyper-text Mark-up Language) has been adapted to form WML (Wireless Mark-up Language), which provides a document mark-up language suitable for WAP-enabled devices and their corresponding limitations. WAP-enabled devices are able to receive and display documents written in WML, thereby enabling such devices to display Web pages which are written in WML, for example.

Unfortunately bandwidth considerations still limit the amount of data which can be rapidly received by WAP-enabled devices, such as cellular telephones for example. This problem is particularly acute with regard to e-mail messages, since the user may wish to only view one e-mail message, such that all of the e-mail messages do not need to be downloaded by the WAP-enabled device. In addition, if the e-mail message is particularly long, the user should not need to wait for the entire single e-mail message to be downloaded by the WAP-enabled device before any part of the e-mail message is converted and decoded.

A more useful solution would enable the user to select individual e-mail messages for viewing. In addition, this solution would also enable the user to begin to view the e-mail message as soon as any part had been converted and decoded for display by the display device. Unfortunately, such a solution is not currently available.

There is thus a need for, and it would be useful to have, a system and a method for transmitting e-mail messages to, and displaying such messages by, a low bandwidth display device, for example to a WAP-enabled device such as a cellular telephone, which enables the user to select a particular e-mail message to be downloaded first, without necessarily downloading the other e-mail messages, and which then prepares the e-mail message for display such that the entire e-mail message does not need to be converted before a first part is displayed by the display device.

BRIEF DESCRIPTION OF THE DRAWINGS

The foregoing and other objects, aspects and advantages will be better understood from the following detailed description of a preferred embodiment of the invention with reference to the drawings, wherein:

FIGS. 3A and 3B are examples of decoded e-mail message data before (FIG. 3A) and after (FIG. 3B) conversion into WML;

SUMMARY OF THE INVENTION

Figure 1:
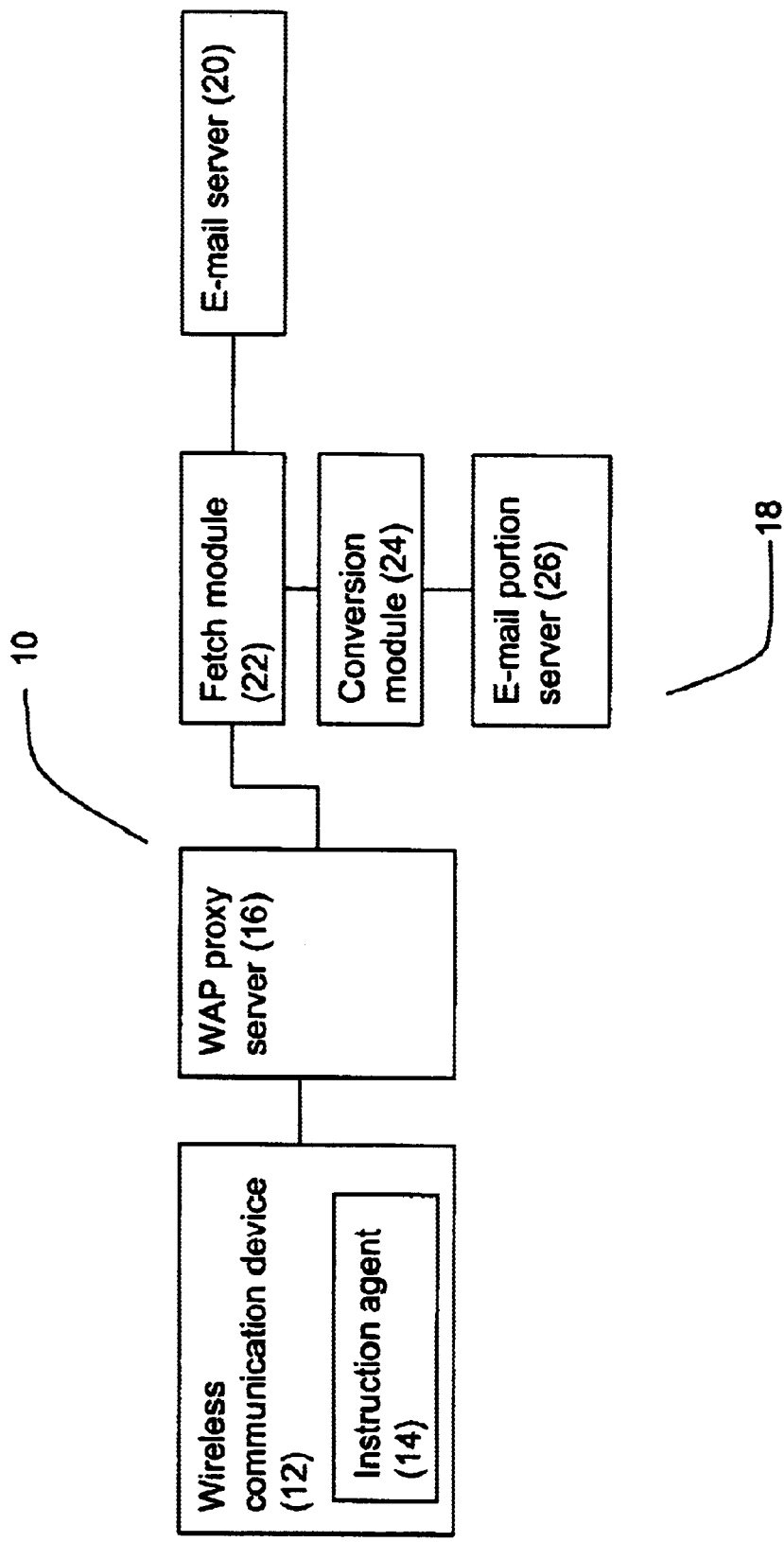
FIG. 1 is a schematic block diagram of a system according to the present invention.

The present invention is of a method and a system for transmitting e-mail messages to, and displaying the contents of such messages by, a low bandwidth device, such as a wireless communication device for example. The present invention is particular preferred for WAP-enabled devices of any type.

The present invention is operative with any e-mail protocol, including but not limited to IMAP4 (Internet Message Access Protocol, version 4) and POP3 (Post Office Protocol 3) for receiving e-mail messages, and SMTP (Simple Message Transfer Protocol) for sending (or forwarding) e-mail messages. Any of these e-mail messages may optionally include an attachment through MIME messages. POP3 is explained with regard to RFC1725, while IMAP4 is explained with regard to RC2060, both from the Network Working Group, although of course the scope of the present invention is not limited to operation with these protocols.

According to the present invention, there is provided a method for displaying an e-mail (electronic mail) message on a low bandwidth display device to a user, the method comprising the steps of: (a) providing a network connected to the display device; (b) determining at least one property of the display device; (c) dividing the e-mail message into a plurality of portions, such that each portion is at least partially determined according to the at least one property of the display device; (d) receiving at least one portion of the plurality of portions through the network by the display device; and (e) displaying the at least one portion by the display device.

According to another embodiment of the present invention, there is provided a system for displaying an e-mail (electronic mail) message to a user, at least a part of the e-mail message being divided into a plurality of portions for display to a user, the system comprising: (a) a low bandwidth display device for displaying at least one portion to the user, the low bandwidth display device having at least one property; (b) an e-mail server for transmitting the e-mail message; (c) an e-mail portion server for receiving the e-mail message from the e-mail server and for dividing the at least a part of the e-mail message into the plurality of portions at least partially according to the at least one property, and for sending at least one portion to the low bandwidth display device; and (d) a network for connecting at least the low bandwidth display device to the e-mail portion server.

Hereinafter, the term "network" refers to a connection between any two electronic devices which permits the transmission of data.

Hereinafter, the term "wireless device" refers to any type of electronic device which permits data transmission through a wireless channel, for example through transmission of radio waves. Hereinafter, the term "cellular phone" is a wireless device designed for the transmission of voice data and/or other data, optionally through a connection to the PSTN (public switched telephone network) system.

Hereinafter, the term "e-mail message" refers to any message which is sent electronically. Hereinafter, the term "low bandwidth" refers to a bandwidth of a communication channel which is less than about 5 Megabits per second, or which otherwise places a limitation on an amount of data which is received through the communication channel by the device.

Hereinafter, the term "computational device" includes, but is not limited to, personal computers (PC) having an operating system such as DOS, Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Microsystems™; or any other known and available operating system, or any device, including but not limited to: laptops, hand-held computers such as the Palm™ computer, cellular telephones, wearable computers of any sort, and WAP-enabled devices, as well as any device which can be connected to a network as previously defined and which have an operating system. Hereinafter, the term "Windows™" includes but is not limited to Windows95™, Windows 3.X™ in which "x" is an integer such as "1", Windows NT™, Windows98™, Windows CE™, Windows2000™, and any upgraded versions of these operating systems by Microsoft Corp. (USA).

The method of the present invention could be described as a series of steps performed by a data processor, and as such could optionally be implemented as software, hardware or firmware, or a combination thereof. For the present invention, a software application could be written in substantially any suitable programming language, which could easily be selected by one of ordinary skill in the art. The programming language chosen should be compatible with the computer hardware and operating system according to which the software application is executed. Examples of suitable programming languages include, but are not limited to, C, C++, WMLscript and Java.

DETAILED DESCRIPTION OF THE INVENTION

The present invention is of a method and a system for transmitting e-mail messages to, and displaying the contents of such messages by, a low bandwidth device, such as a wireless communication device for example. The present invention is particular preferred for WAP-enabled devices of any type.

The present invention is operative with any e-mail protocol, including but not limited to IMAP4 (Internet Message Access Protocol, version 4) and POP3 (Post Office Protocol 3) for receiving e-mail messages, and SMTP (Simple Message Transfer Protocol) for sending (or forwarding) e-mail messages. Any of these e-mail messages may optionally include an attachment through MIME messages. POP3 is explained with regard to RFC1725, while IMAP4 is explained with regard to RC2060, both from the Network Working Group, although of course the scope of the present invention is not limited to operation with these protocols.

The user is preferably able to select any e-mail message, or part thereof, for display, regardless of the order of the e-mail messages on the e-mail server. By "part" of an e-mail message, it is meant the text of the message, or a selection thereof, or alternatively or additionally, an attachment to the e-mail message, or any part of such an attachment or text of the message thereof.

According to preferred embodiments of the present invention, the e-mail message is converted to a format which is suitable for display by the low bandwidth device. Preferably, since the e-mail message itself is sent as an encoded stream of data, the decoding process is able to stream the decoded data as output for conversion to the suitable format for display. More preferably, if the e-mail message is too large to be displayed at once on the display device, then the e-mail message is divided into portions, most preferably after being converted to the suitable format. The user may then optionally select any portion for being displayed.

The present invention incorporates processes for dividing any document into a plurality of portions, as described in the patent application entitled "System and Method for Document Division", by the same inventor as the present application and filed on the same date as the present application, which is hereby incorporated by reference as if fully set forth herein.

According to preferred embodiments of the present invention, navigational capabilities are also provided, such that the user is optionally able to move between entire e-mail messages, portions of such messages and/or portions of attachments by selecting an icon or link for example, and even to view the portions of the message or attachment in a different order than the linear sequence itself. More preferably, a list of the e-mail messages or portions is displayed, optionally with a short title which may be taken from the first line of the text of the e-mail message header and/or attachment for example, in order for the user to be able to select a e-mail message or portion of interest for viewing. Thus, the user could optionally and preferably view e-mail messages and/or portions according to the interests of the user, rather than only according to the order in which they are downloaded.

The principles and operation of a system and a method according to the present invention may be better understood with reference to the drawings and the accompanying description, it being understood that these drawings are given for illustrative purposes only and are not meant to be limiting.

Referring now to the drawings, FIG. 1 is a schematic block diagram of a system according to the present invention for transmitting and displaying an e-mail message by a low bandwidth device. Although the present invention is explained with regard to WAP and a WAP-enabled device, such as a cellular telephone for example, it is understood that this is for the purposes of description only and is without any intention of being limiting. For a reference to WAP, as well as a more detailed explanation, see for example "Programming Applications with the Wireless Application Protocol" (S. Mann, Wiley Computer Publishing, John Wiley and Sons Inc., 1999), incorporated by reference as if fully set forth herein. Furthermore, both the wireless communication device and wireless network which are described below can be viewed as examples of a low bandwidth device and network for the purposes of the present invention.

A system 10 has a wireless communication device 12 for interacting with a user, which operates a WAP-compatible instruction agent 14, such as a microbrowser for example. Requests are sent from wireless communication device 12 to a WAP proxy server (gateway) 16 through a wireless network 18. As a non-limiting example, wireless communication device 12 is optionally a cellular telephone, while wireless network 18 is optionally a cellular telephone communication channel.

WAP proxy server 16 receives the WAP-compatible request and passes the request to an e-mail server 20, which sends and receives e-mail messages according to standard e-mail messaging protocols. For transmitting e-mail messages, an example of such a standard protocol includes but is not limited to SMTP (Simple Message Transfer Protocol), while for receiving e-mail messages, examples of such standard protocols include but are not limited to POP3 and IMAP4.

Preferably, WAP proxy server 16 does not translate the request itself into the standard e-mail messaging protocol, but rather passes the request to a fetch module 22. Fetch module 22 then responds to the request by sending the appropriate command(s) to e-mail server 20, preferably by requesting a list of e-mail messages, for example according to a summary from the header, from e-mail server 20. Fetch module 22 then optionally sends the list of messages to WAP proxy server 16 and hence to wireless communication device 12 for display to the user. The user selects a message to be retrieved and displayed, although alternatively such a message could be automatically selected according to the header information, even without displaying the message to the user. Also alternatively, the e-mail message(s) could be retrieved automatically without regard to either a user request or the header information, such that the conversion process is performed "off-line", before a specific message is requested. Fetch module 22 then sends a request for the particular message from e-mail server 20.

Once the e-mail message is received from e-mail server 20, fetch module 22 sends the received message to a conversion module 24. Conversion module 24 preferably converts the file format of the received message into a standard file format, such as XML for example, although alternatively, conversion module 24 may optionally convert the received message directly to the specific file format which is suitable for wireless communication device 12.

More preferably, conversion module 24 passes the data which has been converted to the standard file format to a particular e-mail portion server 26 according to the present invention. E-mail portion server 26 is optionally and most preferably specific for a particular type of wireless communication device 12, although alternatively, e-mail portion server 26 could be generic for a number of different types of wireless communication devices 12.

Once e-mail portion server 26 receives the message in the standard or generic file format, e-mail portion server 26 prepares the message in a suitable, specific data format for transmission to wireless communication device 12. Preferably, the suitable data format involves the construction of a WML deck, including one or more cards, for WAP-enabled devices. Optionally and more preferably, any attachments to the e-mail message are also converted, as described in greater detail in the application entitled "System And Method For Rapid Document Conversion", by the same inventor as the present application and filed on the same date as the present application. E-mail portion server 26 then sends the formatted message to wireless communication device 12 for display. If the message is too large to be displayed in its entirety, then optionally and preferably a portion of the message is sent to wireless communication device 12 for display.

It should be noted that although each of WAP proxy server 16, fetch module 22, conversion module 24 and e-mail portion server 26 is shown as a separate unit, this is for the purposes of description only, such that two or more of WAP proxy server 16, fetch module 22, conversion module 24, e-mail server 20 and/or e-mail portion server 26 may optionally be operated by the same computational device. Each of WAP proxy server 16, fetch module 22, conversion module 24, e-mail server 20 and e-mail portion server 26 is therefore shown as a separate entity for the purpose of describing the separate functionality only.

Furthermore, each of these functional units could be located at any other location within system 10. For example, e-mail portion server 26 could be located at e-mail server 20, at a base station between WAP proxy server 16 and wireless communication device 12 (not shown), or at any other location within system 10. If all of these modules (apart from wireless communication device 12 and instruction agent 14) are located at e-mail server 20, then most preferably all of the e-mail messages could be converted "off-line" for greater efficiency once the user requests to see any e-mail message.

The process of retrieving the e-mail message is explained in greater detail with regard to the flowchart in FIG. 2 below, while the process of converting the e-mail message into WML is described in greater detail with regard to FIG. 3 below. The process of dividing the formatted message into portions, if necessary, is explained in greater detail with regard to FIG. 5 below. Also, FIGS. 6A and 6B below describe the method of the present invention with regard to navigating through the portions of the e-mail message and/or attachment, if any (FIG. 6A), as well as an exemplary GUI (graphical user interface) display of a portion on the screen of the display device (FIG. 6B).

Figure 2:
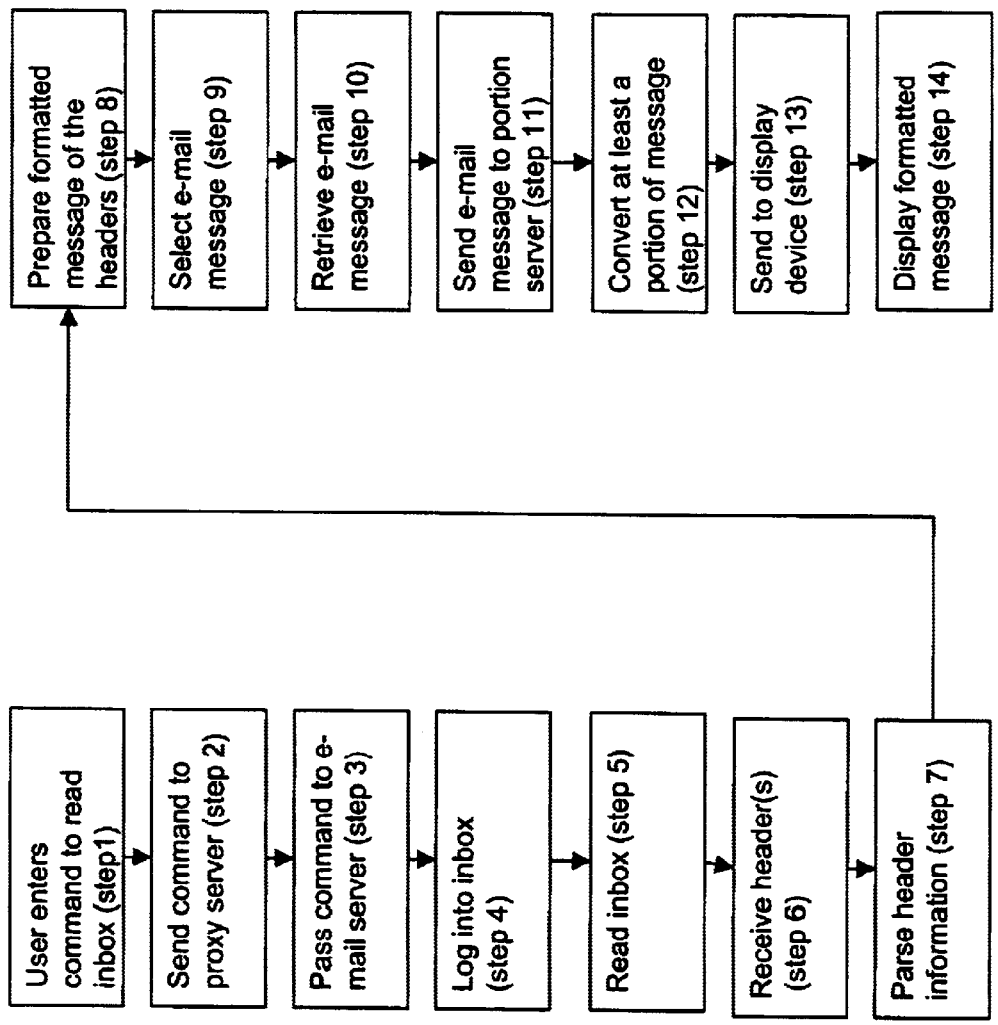
FIG. 2 is a flowchart of an exemplary method according to the present invention for retrieving and displaying the e-mail message by the low bandwidth device.

FIG. 2 is a flowchart of an exemplary method according to the present invention for retrieving the e-mail message, formatting the message and then sending the formatted message to the display device for display. The flowchart is explained with regard to the system of FIG. 1, it being understood that the method of the present invention could also be operative with other systems.

In step 1, the user enters a command to the display device to read the e-mail "inbox" of the user. As described in greater detail with regard to FIGS. 5A and 5B, such a command could be entered in a number of different ways, for example by selecting an icon or link, or by selecting a key on the keypad of the device which has been mapped to that command. Alternatively, the e-mail message(s) could be retrieved automatically without regard to the user request, such that the conversion process is performed "off-line", before a specific message is requested.

In step 2, the command is sent from the display device to the WAP proxy server. The WAP proxy server then passes the request to the e-mail portion server of the present invention in step 3. It should be noted that steps 2 and 3 could be collapsed together if the e-mail portion server of the present invention is implemented as part of the WAP proxy server, as described in greater detail above.

In step 4, the e-mail portion server "logs into", or gains access permission for, the inbox of the user on the e-mail server. The remainder of the method is explained with regard to the POP3 protocol (RFC 1725 from the Network Working Group), although the method could also be performed with regard to the IMAP4 (Internet Message Access Protocol, version 4) protocol (RFC2060 from the Network Working Group).

IMAP4 has the advantage of supporting commands such as "SEARCH", which enable the e-mail server to return only e-mail messages of interest, such that the e-mail portion server does not need to parse the headers of the e-mail messages in order to determine which message(s) are of interest. IMAP4 also supports the ability to retrieve only part of the e-mail message directly, with the "FETCH" command. For example, the command "fetch 12 body[header]" causes only the header of message 12 to be retrieved. In addition, a complex request for part of an attachment can also be sent with the "FETCH" command.

Returning now to step 4, for example for an e-mail server which communicates according to the POP3 protocol, this involves establishing a TCP connection through a handshake procedure between the e-mail portion server and the e-mail server (see for example RFC1725 from the Network Working Group for a description of this protocol). Once the connection has been established, the e-mail server sends a greeting to the e-mail portion server, after which commands may be exchanged for retrieving e-mail messages. These commands typically include sending information from the e-mail portion server to the e-mail server for the purposes of authorization, such as a user name for identifying the inbox and a password, as well as transaction commands for actually receiving the e-mail message(s).

In step 5, if step 4 is successful, then the e-mail portion server sends at least one command to the e-mail server to read the inbox of the user. First, the e-mail portion server could send the "STAT" command to determine the total number of messages and the total size of these messages. The e-mail portion server then sends the "LIST" command to the e-mail server to receive a list of e-mail messages. The received list includes the message identification numbers. The e-mail portion server then sends the "TOP" command, with a message identification number, optionally with the number zero to indicate that only the header is to be retrieved.

Step 5, or any part thereof as required, is preferably repeated as necessary such that in step 6, the e-mail portion server receives at least one, but preferably all, of the headers of the e-mail messages which are in the inbox.

In step 7, the e-mail portion server optionally and preferably parses the header information, more preferably according to at least one user preference. For example, the user could request to see only the identity of the sender and the subject of the e-mail message. As described with regard to RFC822 and RFC2045 (Network Working Group), the e-mail message has a predefined message structure, such that the header itself includes everything before the first blank line, after which the message body is given. The header includes fields, which are indicated according to a predefined lexical structure.

For example, the "subject" field is an optional field which could be used for a text string describing the subject of the e-mail messages. For a MIME multipart message, the content-type header field ("content") includes a description of the structure of the message, or a description of the type of the attachments, if any. For example, the MIME message may be composed of a plurality of sub-messages, each of which is a MIME entity.

Any one or more fields of the header could optionally be examined according to a request of the user, in order to provide information of interest to the user. The e-mail portion server must at least retrieve the message identification number for the e-mail message.

In step 8, the e-mail portion server optionally and preferably prepares a formatted message containing the information of interest to be sent to the wireless communication device for display to the user. For the system of FIG. 1, such a formatted message is preferably a WML deck, containing one or more cards. The formatted message is then sent to the display device for display to the user.

In step 9, the user enters a command to select a first e-mail message of interest, for example by selecting an icon or link, or by selecting a key which has been mapped to this command. The command(s) are optionally entered as previously described. Optionally and preferably, or even alternatively, the user could enter a command to select a particular attachment of an e-mail message.

Alternatively, steps 8 and 9 could be replaced by a combined step in which the e-mail portion server automatically selects a first e-mail message and/or attachment, for example according to the previously described user preferences for determining the header information which is to be displayed.

In step 10, once an e-mail message and/or an attachment has been selected to be displayed, then the selected e-mail message is retrieved with the "RETR" command according to the identification number of the e-mail message, which is sent from the e-mail portion server to the e-mail server.

In step 11, the selected e-mail message is sent from the e-mail server to the e-mail portion server.

In step 12, the e-mail portion server converts at least a part of the e-mail message to WML, optionally including division into portions and navigation as described in greater detail below. This part of the e-mail message may optionally include a part of the text of the message in ASCII characters or in another character set, for example as identified by the "Content-type: text/plain" field in the header. A plain e-mail message as defined by RFC822 defaults to this content. However, this part of the e-mail message may also optionally include at least a part of an attachment, which is identified by its particular content type, such as "Content-type: image/gif" for graphical image content in the GIF file format, for example.

In addition, more preferably, the type of encoding used for the part of the e-mail message of interest is retrieved from the "Content-Transfer-Encoding" field. Types of encoding include, but are not limited to, 7 bit, 8 bit, binary, base64, and so forth (see RFC2045 for a description of different types of encoding). The e-mail portion server then uses information concerning the type of encoding to decode the e-mail message.

Most preferably, the e-mail message is decoded in a streamed manner, such that as any part of the message becomes decoded, that part is converted to WML and is sent to the display device for display in step 13. Alternatively, the e-mail portion server could decode the entire e-mail message or other selected part of the message before sending any part to the display device. Optionally, the size of the part of the message which is sent to the display device could be determined according to the criteria for determining portion size, as described in greater detail with regard to FIG. 5 below.

The actual method applied for decoding the data depends upon the encoding method which was used. The codes for the data are described in RFC2045. Briefly, as an example, Base64 Content-Transfer-Encoding transforms 24-bit groups of input bits into strings of four encoded characters as the output, according to a table given in RFC2045. Decoding reverses the procedure, and takes every four encoded characters for transformation back to the original data according to the correspondence given in the table. After decoding, the data is in the original content type, such as text for example, and can easily be converted to WML. Optionally and additionally, TIFF or other graphical file format information can be converted using OCR (optical character recognition) to form a WML format message, for example for a page which was sent by facsimile, in order to increase the speed and efficiency of the conversion process.

In step 14, the converted part of the e-mail message is sent to the display device for display.

According to preferred embodiments of the present invention, MPEG (Motion Picture Expert Group) video data or other video can also optionally be converted for display by the wireless communication device as follows. First the video data is divided into the constituent frames. Next, at least one frame image is sent separately to the wireless communication device, while the voice or other audio data is sent over the voice channel, for example for a video telephone call.

FIGS. 3A and 3B are examples of decoded e-mail message data before (FIG. 3A) and after (FIG. 3B) conversion into WML. As shown, basic formatting information, such as a line break for example, is translated into elements. Once these elements have been added, the converted data is formed into a WML card, which can then be sent as part of a WML deck for example.

Figure 4:
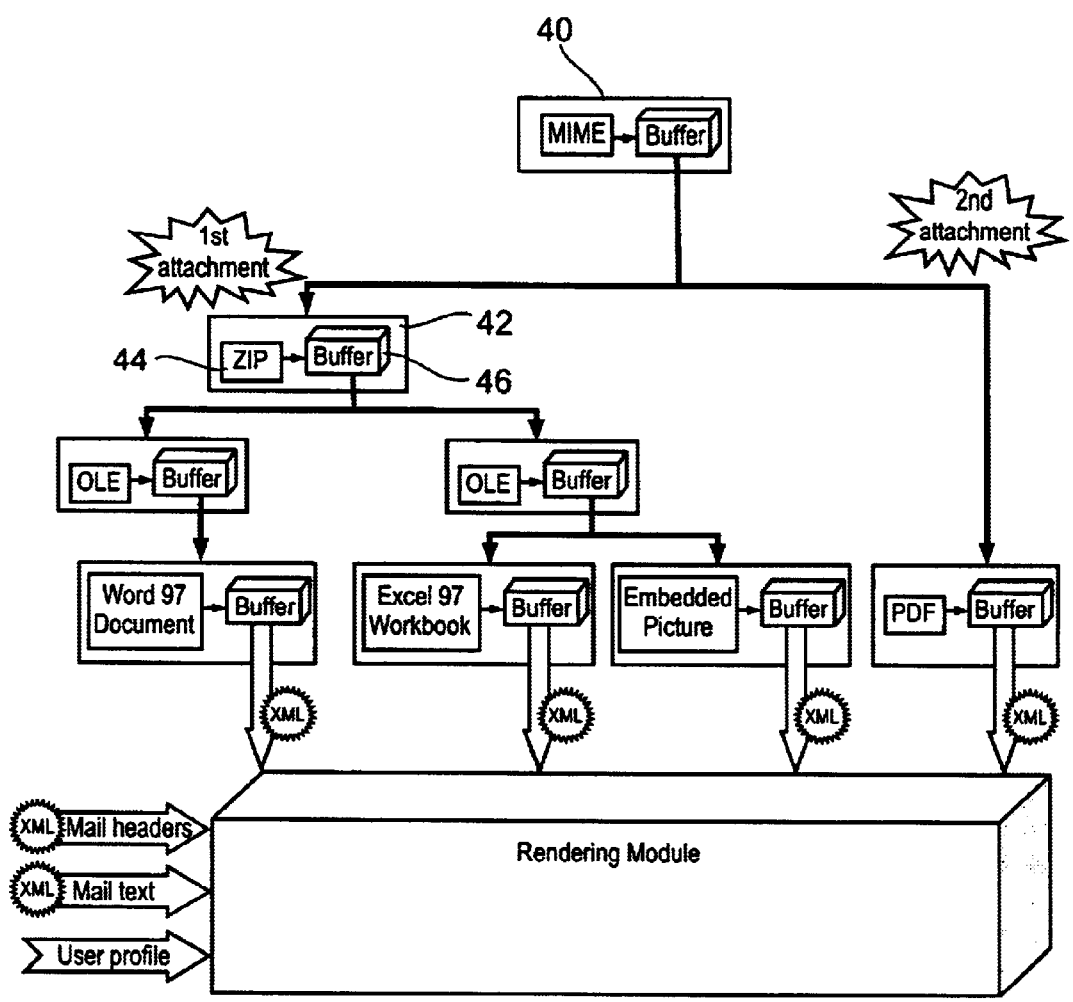
FIG. 4 is a flow diagram for the conversion of a MIME multipart message into a generic file format according to the present invention.

FIG. 4 is a flow diagram for the conversion of a MIME multipart message into a generic (standard) file format, such as XML for example, although a similar method could be used for conversion of the multipart message into substantially any other file format. As shown, a MIME multipart message 40 is analyzed and converted by at least one modular machine 42, which includes a converter 44 and a data buffer 46. Data buffer 46 holds any data which is required for the operation of a subsequent modular machine 42, and is preferably identical for each modular machine 42.

Each modular machine 42 may optionally request specific information from one or more modular machines 42, such as information in a specified location in the modular document or information which is located in another, subsequent or previous, module. In addition, each modular machine 42 may then respond to one or more modular machines 42. Modular machine 42 from which the information is requested may optionally disregard such a request, or alternatively may decide to satisfy this request immediately. Preferably, modular machine 42 balances the satisfaction of the request against the requirement for optimized performance, for example with regard to answering requests sequentially, as opposed to a more efficient but non-sequentially performed group of responses. More preferably, modular machine 42 queues the incoming requests, for example by storing the requests in data buffer 46. Modular machine 42 may then optionally answer requests sequentially or non-sequentially.

Modular machine 42 may optionally and preferably be required to wait until the requested data is available before performing the next action in the process of conversion, although again, the requirement for waiting is more preferably balanced against optimization of the conversion process. For example, depending upon the structure of the MIME multipart message, if modular machine 42 requires data from two other modular machines 42, but only receives data from one such modular machine 42, the requesting modular machine 42 may optionally be allowed to perform any action(s) which are possible with the current data, before waiting for the response to the other request.

Modular machine 42 may optionally and more preferably determine the type of module for which information is supplied. The output of each modular machine 42 is optionally a generic file format, which is then more preferably rendered into a specific file format according to the profile of user preferences and/or device capabilities. This generic output format is preferably XML. An example of a specific file format is a WML deck containing a WML card. Alternatively, only the final modular machines 42 would produce data in the generic file format, while the previous modular machines 42 would optionally produce binary data for example.

More preferably, each different type of data conversion, for example from a "ZIP" file format to a plurality of OLE components, is performed by a specific modular machine 42 as shown.

Figure 5:
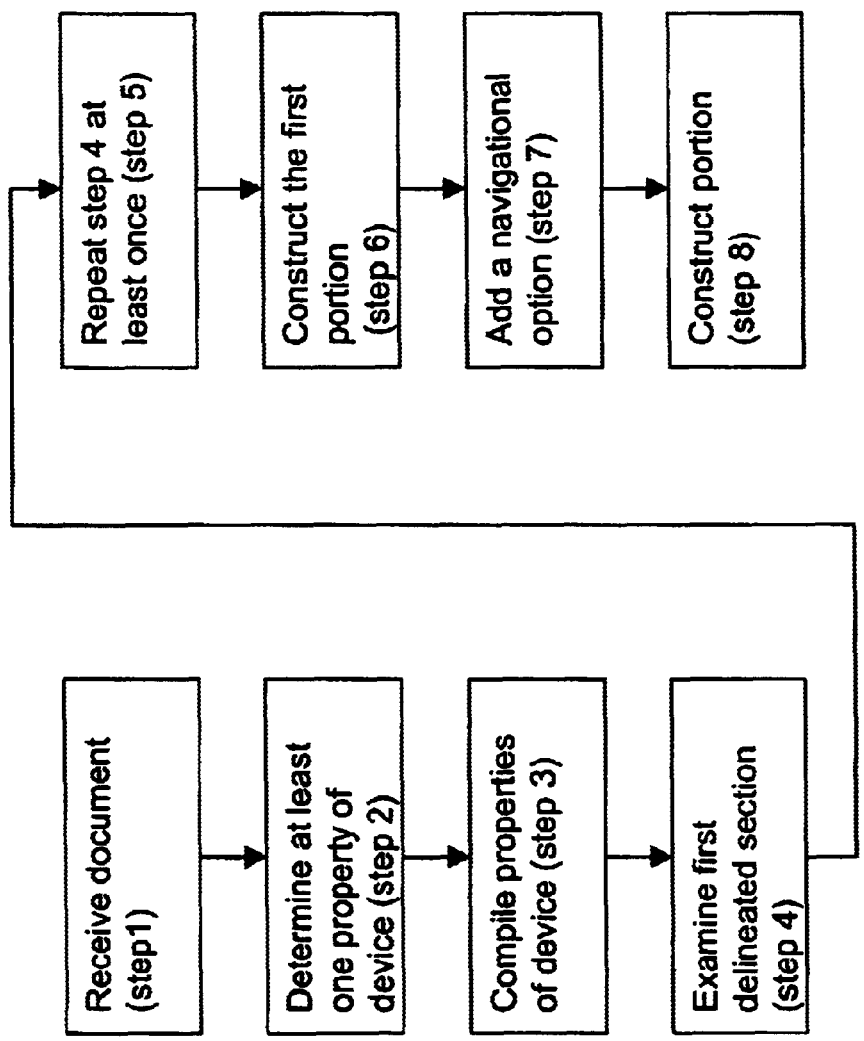
FIG. 5 is a flowchart of an exemplary method according to the present invention for dividing a formatted document into a plurality of portions.

FIG. 5 is a flowchart of an exemplary method according to the present invention for dividing a document into a plurality of portions for display by the wireless communication device. This method is useful for the text of the e-mail message (an "e-mail message" as defined according to RFC822), and/or for an attachment, if any. The method is described with regard to a mark-up language document, such as the WML format message into which the decoded e-mail message data is converted.

Briefly, the present invention is operative with any document featuring delineated sections. By "delineated sections", it is meant that each section has one or more associated attributes, which may be used to determine how the document is displayed. In the case of HTML, which uses tags, or WML, which uses elements, the delineations are clear between sections. Although each section does not necessarily need to form a separate portion for transmission and/or display, and indeed a section may be divided between a plurality of portions, the sections are useful for parsing the document in order to ensure that the associated data, such as text and/or graphics, for example, is properly displayed in each portion. The delineated section may even be as simple as a line or paragraph break, or even determined according to the words of a document, for example for textual e-mail messages such as those defined according to RFC822.

The delineated sections of the document are optionally nested, such that a single segment of the document may contain a first section within a second section, for example. Nesting of such sections is typically present in mark-up language documents, such as HTML and WML documents, in which tags/elements may be nested for example.

As shown in FIG. 5, in step 1, a document is received. Preferably, the document contains a plurality of delineated sections as previously described. If the document is a WML deck with one or more cards, then these sections are defined by elements.

In step 2, optionally and preferably, at least one property of the wireless communication device is determined. By "determined" in this step, it is meant that the property is known for the purpose of dividing the document into portions. For example, as described in greater detail below, the property may be retrieved through communication with the wireless communication device itself, and/or with a third party which holds this information regarding the wireless communication device. The property may also optionally be determined through a user defined preference. More preferably, if the property is not received from an external source, the property is determined from a predefined default value. This property may optionally be a property of the hardware, and/or may optionally be a property of a software agent or program being operated by the wireless communication device.

This at least one property may optionally include, but is not limited to, one or more of the following characteristics: available bandwidth to the wireless communication device; microbrowser or software agent type for the software which causes the data to be displayed by the wireless communication device; characteristics which are determined by the capabilities of the wireless communication device such as lines per screen which may be displayed, characters per line, pixels per line, screen resolution, and whether the screen is grayscale or color; available font type(s), whether various types of content are permitted for display such as sound and graphic images; whether the microbrowser is permitted to operate scripts and/or cookies; the level of support, if any, which is provided by the microbrowser for HTML, CSS (cascading style sheets), WAP; and so forth.

Optionally and preferably, such information may be retrieved by some type of automatic process through communication with the wireless communication device, particularly with the microbrowser or other software agent of the wireless communication device. Alternatively and preferably, the information is retrieved from a third party, such as that provided by CC/PP (Composite Capability/ Preferences Profiles; see for example http://www.w3c.org/ TR/NOTE-CCPP and http://www.w3c.org/TR/NOTE-CCPPexchange). Alternatively, the portion server may retrieve this information from another source, such as a predetermined and stored set of device and microbrowser characteristics, or else from user-defined preferences with regard to the division of the document into portions, for example.

In step 3, the property or properties of the microbrowser are preferably compiled, in order to determine how each such property affects the display of the portion of the document, such as the WML deck containing the part of the e-mail message, on the wireless communication device. More preferably, the collected properties with regard to the screen on the wireless communication device itself are mapped to a predetermined portion construction template, in order to more easily construct the portion as described in greater detail below.

In step 4, the first delineated section is examined, which in this case is determined by the first element. Preferably, this includes determining the attribute or attributes associated with that section. More preferably, the number of characters associated with the section is also determined, optionally with the size or other attribute(s) of the characters, such as the font for example. Optionally, white spaces and empty lines are removed. If no characters are present, then preferably the size of an associated image is determined, if available, or at least the presence of the image is determined. The information which is gathered during each parsing step is then preferably stored.

In step 5, step 4 is optionally and preferably repeated at least once, and more preferably is repeated until the end of the document is reached.

In step 6, the first portion is constructed from the parsed data. As previously mentioned, the property or properties related to the display screen of the wireless communication device are preferably compiled, in order to be able to map these properties to a predetermined template. The template is able to receive each character and/or image to be displayed, and to place the character and/or image within the display screen. For example, characters are received for each line until the line has been filled. At that point, preferably a line break symbol is added, such as a line break element for example, in order to indicate that the end of the line has been reached.

Also more preferably, the template is adjustable during the process, such that if a particular component of the document occupies a larger amount of space than an "average" line of the display, the remainder of the template is adjusted to account for the extra required space. For example, if the component is an image, optionally the remainder of the template is adjusted in order to cause any additional text to wrap around the image, by reducing the length of at least one line next to the image. These adjustments are then optionally stored as differences from the template.

Alternatively, each portion may be flexibly constructed according to the number of horizontal and vertical pixels on the display screen of the wireless communication device. The parsed data would then need to be examined with regard to attributes of the delineated section. The attributes themselves are described in greater detail below. The amount of space which each attribute causes the text and/or image to occupy is preferably determined. These attributes include, but are not limited to, font type and height; spacing between the lines; the size of the image in terms of the height and width in pixels; the size of any borders or separations; and so forth. The image may also optionally be changed into a different format and/or be reduced in size for display on the display device, such as the wireless communication device. The number of colors could also be reduced for reducing the amount of data which must be transmitted.

Preferably, the attribute(s) of the delineated section associated with the parsed data are also constructed, such that these display attributes are preserved when displaying the portion on the display screen.

Optionally and more preferably, elements and other attribute commands are not included in the determination of length and number. Alternatively, these attribute commands could be included in a calculation of a total size of the portion, if the size of the portion itself is to be determined rather than the characteristics of the displayed data. Also alternatively, certain attributes, such as paragraph breaks, could be used to help determine the boundary of a portion, for example in order to permit a paragraph to be contained in a single portion, particularly if the size of the displayed data for each portion is allowed to be variable.

More preferably, step 6 features the following steps for constructing a portion from a document which includes elements. In step (i), any elements from the previous portion which also apply to the current data are read, for example in the case where a section has been split between portions. In step (ii), any other element or elements are read from the parsed data. In step (iii), these elements from steps (i) and (ii) are added to the portion, in the order in which they are retrieved from the data.

In step (iv), further data is read and added to the portion, until the end of the available space for the portion is reached. End elements are applied as they are encountered in the parsed data. In step (v), any elements for which end elements have not been applied are determined. In step (vi), the end elements (if any) are added to the portion, in the reverse order to which the elements were initiated. In step (vii), these elements are stored for being added to the beginning of the next portion, as for step (i). The actual elements themselves should not be split between portions.

According to preferred embodiments of the present invention, these steps are adjusted for the parsing and displaying of tables. In particular, as a portion may not be able to contain an entire table, then preferably the number of columns, and their properties, and/or the number of rows, and their properties, are stored during the parsing process. For example, if a table contains rows which are too long (horizontally) for display within a single portion, then preferably those columns which are not displayed within that portion are added to the next portion, with their associated properties.

Rows which are too wide (vertically) for display within a single portion need to be split within each cell, in order to place a first part of the cell in a first portion, a second part of the cell in a second portion and so forth.

In step 7, if a portion is to feature navigational icons or links, collectively referred to as a "navigational option", these items are preferably added to the portion. Since these items do require space for display, they must be considered when determining the total display size for the data of the portion. Furthermore, the type and size of images may differ between microbrowsers or other software agents, particularly if locally stored images are used, as indicated with the localsrc attribute of the image in WML, for example. These attributes of the images need to be considered when constructing the portion. In addition, not all software agents and/or wireless communication devices support images, such that in the place of an image, a text string may be displayed, which again affects the size of the portion.

In step 8, once a portion has been constructed, it may optionally be sent to the wireless communication device. However, preferably all of the portions are constructed before any portion is sent to the wireless communication device, for ease of navigation as described in greater detail with regard to FIGS. 5A and 5B below.

Figure 6A:
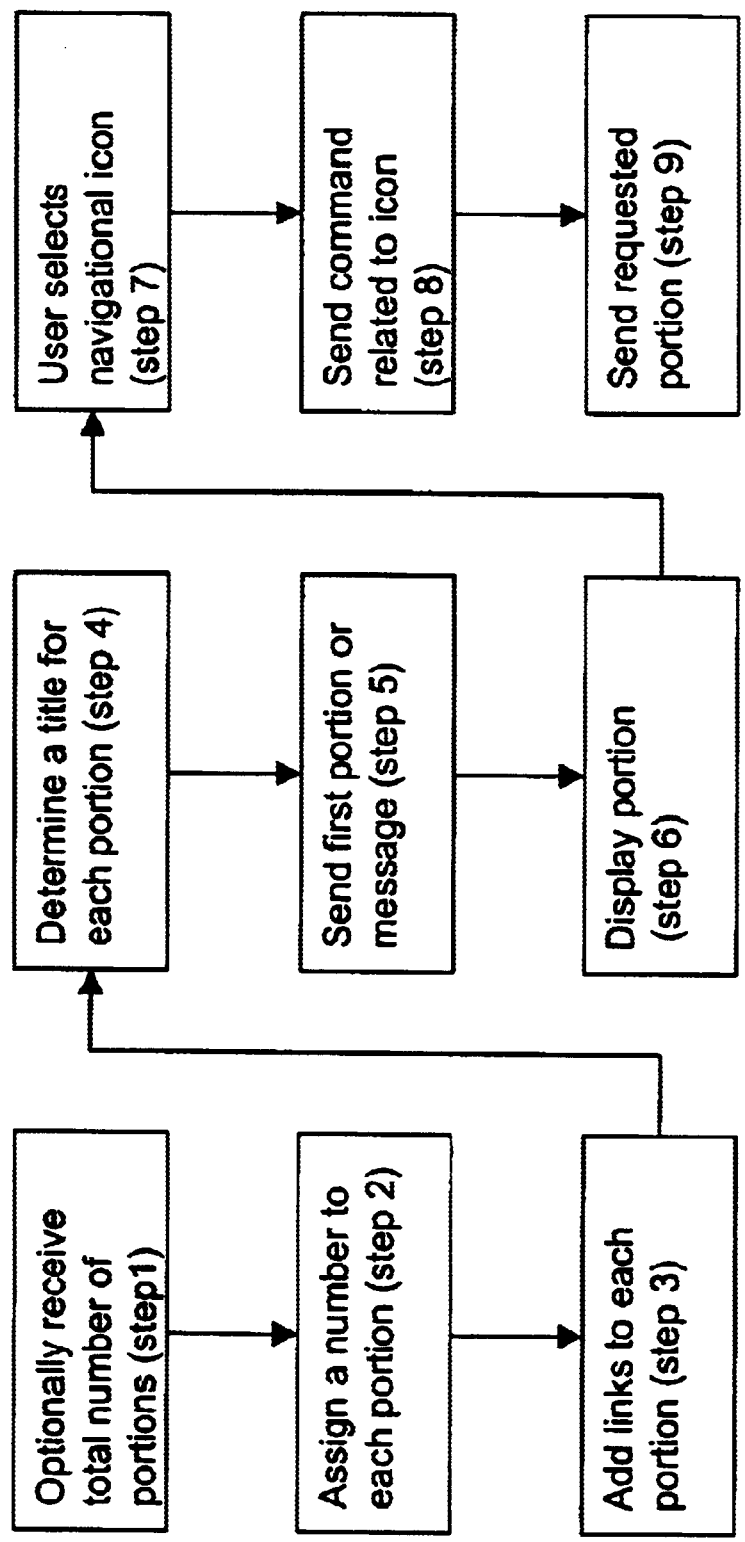
FIGS. 6A and 6B show the method of the present invention with regard to navigating through the portions of the e-mail message and/or attachment, if any (FIG. 6A), as well as an exemplary GUI (graphical user interface) display of a portion on the screen of the display device (FIG. 6B).
Figure 6B:
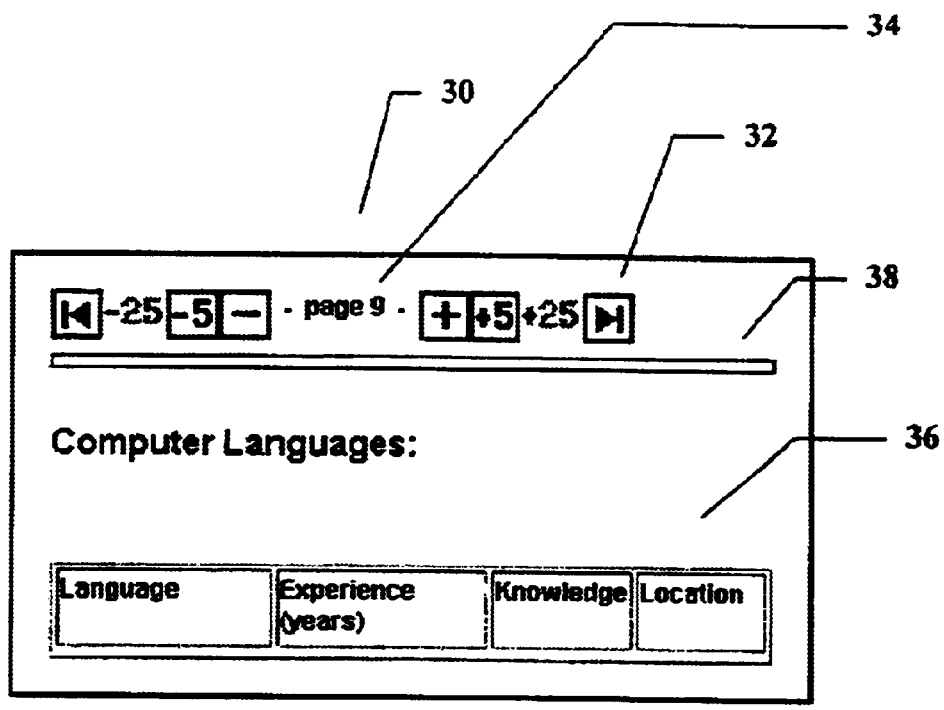

FIG. 6A is a flowchart of an exemplary method for navigating between portions according to the present invention. In step 1, preferably the total number of portions is received from the process of FIG. 5, although optionally navigational capabilities could be added to each portion as it is constructed. Also optionally, each portion could be constructed "on the fly" and received from the process of FIG. 5.

In step 2, a number is assigned to each portion, indicating the location of the portion within the sequence of portions. In step 3, a link from the current portion to the previous portion is provided, as well as a link from the current portion to the next portion. Optionally, links to other portions are provided, for example to a portion which is located five portions away from the current portion, and so forth.

In step 4, optionally and preferably, a title is determined for each portion, for example from the first line of text, if any, as previously described. Such a title is preferably determined if a message is sent to the user which contains a list of the portions with titles, as previously described.

In step 5, either the first portion, or a message containing a list of portions, is sent to the user. Assuming that a portion is sent to the user, then in step 6, the portion is displayed as shown in FIG. 6B below. The display preferably contains navigational icons and/or link indicators, in order for the user to be able to select a different portion.

According to preferred embodiments of the present invention, the user is able to navigate through the portions according to commands entered through a mapping of certain keys on the keypad of the wireless communication device. For example, the numeric key "9" could optionally be mapped to the "page down" command, the numeric key "3" could optionally be mapped to the "page up" command, the numeric key "1" could optionally be mapped to the "end of document" command for moving to the last portion of the document, the numeric key "5" could optionally be mapped to the "start of document" command for moving to the first portion of the document, and the numeric key "2" could optionally be mapped to entering a page number for the portion of interest. Of course, other mappings are also possible within the present invention.

Also preferably, the portion is sent as a MIME (Multipurpose Internet Mail Extensions) multipart message if text is combined with one or more graphic images, in order for the portion to be received as a single unit, without requiring the microbrowser to retrieve the graphic image separately. Such a multipart message contains the text and the graphic image(s), separated by separators.

In step 7, the user indicates a particular icon or link for retrieving a different portion. In step 8, a command is sent from the wireless communication device of the user to the server. In step 9, the requested portion is sent to the wireless communication device, if the portion has not yet been received by the device. However, at least for the implementation of the present invention with WML, portions which have already been received by the wireless communication device can be retrieved again with predefined commands from local storage. For example, the "<prev>" element of WML is used to navigate to the previous card. This process is optionally repeated until the user has viewed all of the document and/or terminates the request.

FIG. 6B is an exemplary display of a portion by a display screen of a wireless communication device according to the present invention. As shown, a top segment 30 of the display includes at least one, but preferably a plurality of, navigation icons 32 or other navigation indicators. In addition, top segment 30 also preferably features a portion number 34, for indicating the number of portion within the sequence of portions.

A display segment 36 shows the data for the portion itself, in this case featuring text with formatting. Optionally, display segment 36 may be separated from top segment 30 by a border separator 38.

It will be appreciated that the above descriptions are intended only to serve as examples, and that many other embodiments are possible within the spirit and the scope of the present invention.

What is claimed is:

1. A method for displaying an e-mail (electronic mail) message on a low bandwidth display device to a user, the method comprising the steps of:
    (a) providing a network connected to the display device;
    (b) determining at least one property of the display device;
    (c) dividing the e-mail message into a plurality of portions, such that each portion is at least partially determined according to said at least one property of the display device;
    (d) receiving at least one portion of said plurality of portions through said network by the display device; and
    (e) displaying said at least one portion by the display device.

2. The method of claim 1, wherein said display device is a wireless communication device, and said network is a wireless network.

3. The method of claim 2, wherein said wireless communication device is a cellular telephone, and said wireless network is a cellular telephone network.

4. The method of claim 3, wherein said at least one property of said cellular telephone is a size of a display screen of said cellular telephone.

5. The method of claim 3, wherein said at least one property of said cellular telephone is an amount of bandwidth available on said cellular telephone network.

6. The method of claim 1, wherein the e-mail message is encoded and step (c) further comprises the steps of:
    (i) decoding at least part of the e-mail message to form decoded data; and
    (ii) converting at least part of the decoded data into a formatted message for being displayed by the display device.

7. The method of claim 6, wherein step (ii) is performed before the entirety of the e-mail message is decoded.

8. The method of claim 6, wherein the e-mail message includes an attachment, and steps (i) are (ii) performed on said attachment.

9. The method of claim 1, wherein step (c) includes the step of:
    (i) converting at least part of the e-mail message into a formatted message for being displayed by the display device.

10. The method of claim 9, wherein step (i) is performed after the e-mail message is divided into said plurality of portions, such that said at least part of the e-mail message is one of said plurality of portions.

11. The method of claim 9, wherein step (i) is performed before the e-mail message is divided into said plurality of portions.

12. The method of claim 9, wherein said formatted message features a plurality of delineated sections, each delineated section having at least one attribute, such that each portion of said plurality of portions features said at least one attribute.

13. The method of claim 12, wherein said formatted message is written in a mark-up language, said mark-up language featuring a plurality of elements, each element corresponding to an attribute, such that step (c) further comprises the steps of:
    (ii) detecting a start for each element;
    (iii) applying said attribute to said portion; and
    (iv) if said portion ends before an end element is detected, generating a generated end element for said portion.

14. The method of claim 13, wherein step (c) further comprises the steps of:
    (v) storing a marker for each generated end element; and
    (vi) applying each element corresponding to said marker to a subsequent portion.

15. The method of claim 13, wherein said mark-up language is WML (Wireless Mark-up Language), such that the display device is a WAP (wireless application protocol) enabled device.

16. The method of claim 15, wherein the e-mail message includes an attachment, such that said at least a part of the e-mail message is at least a part of said attachment.

17. The method of claim 12, wherein a new portion is started according to an amount of data, said attribute being applied to said new portion.

18. The method of claim 1, wherein step (e) includes the step of displaying at least one navigation option for selecting a portion to the user through the display device, the method further comprising the steps of:
    (f) selecting said at least one navigation option by the user through the display device; and
    (g) retrieving at least one additional portion according to said at least one navigation option.

19. The method of claim 18, wherein the plurality of portions has a sequence, and at least one portion is not displayed by said display device according to said sequence.

20. The method of claim 18, wherein said at least one navigation option is selected from the group consisting of an icon and a link.

21. The method of claim 18, wherein the display device has a keypad with a plurality of keys, at least one key being mapped to a navigation option, and said at least one navigation option is selected through a key on said keypad, such that said at least one navigation option is displayed by said key.

22. The method of claim 1, wherein steps (b) and (c) are performed in advance, before the user requests the e-mail message.

23. A system for displaying an e-mail (electronic mail) message to a user, at least a part of the e-mail message being divided into a plurality of portions for display to a user, the system comprising:
    (a) a low bandwidth display device for displaying at least one portion to the user, said low bandwidth display device having at least one property;
    (b) an e-mail server for transmitting the e-mail message;
    (c) an e-mail portion server for receiving the e-mail message from said e-mail server and for dividing the at least a part of the e-mail message into the plurality of portions at least partially according to said at least one property, and for sending at least one portion to said low bandwidth display device; and (d) a network for connecting at least said low bandwidth display device to said e-mail portion server.

* * * * *